US010083051B1

(12) United States Patent
Mahapatra et al.

(10) Patent No.: US 10,083,051 B1
(45) Date of Patent: Sep. 25, 2018

(54) SYSTEM, METHOD, AND CODE FOR CLASSIFYING RESOURCES OF A VIRTUAL COMPUTING ENVIRONMENT

(71) Applicant: VCE COMPANY, LLC, Richardson, TX (US)

(72) Inventors: Akshaya Mahapatra, San Jose, CA (US); John James Mulqueeney, Jr., San Bruno, CA (US); Goutam Das, Fremont, CA (US); Vandana Rao, San Jose, CO (US)

(73) Assignee: VCE IP Holding Company LLC, Richardson, TX (US)

( * ) Notice: Subject to any disclaimer, the term of this patent is extended or adjusted under 35 U.S.C. 154(b) by 205 days.

(21) Appl. No.: 14/250,928

(22) Filed: Apr. 11, 2014

(51) Int. Cl.
G06F 15/16 (2006.01)
G06F 9/455 (2018.01)
G06F 9/50 (2006.01)

(52) U.S. Cl.
CPC ...... *G06F 9/45533* (2013.01); *G06F 9/45558* (2013.01); *G06F 9/5072* (2013.01); *G06F 9/5077* (2013.01)

(58) Field of Classification Search
CPC .. G06F 9/5072; G06F 9/45558; G06F 9/5077; H04L 47/70
See application file for complete search history.

(56) References Cited

U.S. PATENT DOCUMENTS

| 2011/0161483 A1* | 6/2011 | Takemura | G06F 9/5088 709/223 |
| 2012/0016895 A1* | 1/2012 | Butt | G06F 17/30985 707/758 |
| 2012/0182993 A1* | 7/2012 | Hadas | H04L 12/4641 370/392 |
| 2012/0254860 A1* | 10/2012 | Bozek | G06F 9/461 718/1 |
| 2013/0212576 A1* | 8/2013 | Huang | G06F 9/45558 718/1 |
| 2014/0019797 A1* | 1/2014 | MacDonald | G06F 9/5011 714/4.1 |
| 2014/0068183 A1* | 3/2014 | Joshi | G06F 12/0866 711/114 |
| 2014/0130046 A1* | 5/2014 | Okuno | G06F 9/45533 718/1 |
| 2014/0208414 A1* | 7/2014 | Brandwine | G06F 21/6218 726/17 |
| 2014/0269712 A1* | 9/2014 | Kidambi | H04L 12/4633 370/392 |
| 2014/0280940 A1* | 9/2014 | Chapman | H04L 41/50 709/225 |

(Continued)

Primary Examiner — Hieu Hoang
(74) Attorney, Agent, or Firm — Polsinelli PC

(57) ABSTRACT

An operations management system includes a processing system and a memory for storing an operations management application, which is executed by the processing system to collect resource information associated with hardware resources and virtual objects of a virtual computing environment. The system identifies, for one or more services provided by the virtual computing environment, the hardware resources and the virtual objects that execute the services, generates a tag for each resource indicating which services are executed by that resource, and stores the collected resource information for each resource and its respective tag in the memory.

16 Claims, 6 Drawing Sheets

(56) References Cited

U.S. PATENT DOCUMENTS

2015/0200941 A1* 7/2015 Muppidi, Sr. ........... H04L 41/28
 726/1
2015/0215228 A1* 7/2015 McMurry ............... H04L 47/70
 709/226

* cited by examiner

SYSTEM, METHOD, AND CODE FOR CLASSIFYING RESOURCES OF A VIRTUAL COMPUTING ENVIRONMENT

TECHNICAL FIELD

Aspects of the present disclosure relate to computing devices and, in particular, to a system, method, and code for classifying resources of a virtual computing environment.

BACKGROUND

Computing resources used by enterprises, such as corporations and universities, are often provided by data centers that utilize multiple computing devices (e.g., hardware resources) that function in a collaborative manner to meet the computing resource needs of the enterprise. Early data center designs were very complex and difficult to maintain due to technology available at that time. To remedy these problems, converged infrastructures were introduced that provided a standardized package of components that were combined into a single, optimized computing solution. Converged infrastructures commonly used today are implemented with a virtual computing environment that includes a structured combination of multiple virtual objects that are executed on independently functioning hardware resources commonly referred to as hosts.

SUMMARY

According to one aspect of the present disclosure, an operations management system includes a processing system and a memory for storing an operations management application, which is executed by the processing system to collect resource information associated with hardware resources and virtual objects of a virtual computing environment. The system identifies, for one or more services provided by the virtual computing environment, the hardware resources and the virtual objects that execute the services, generates a tag for each resource indicating which services are executed by that resource, and stores the collected resource information for each resource and its respective tag in the memory.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Figure 1A:
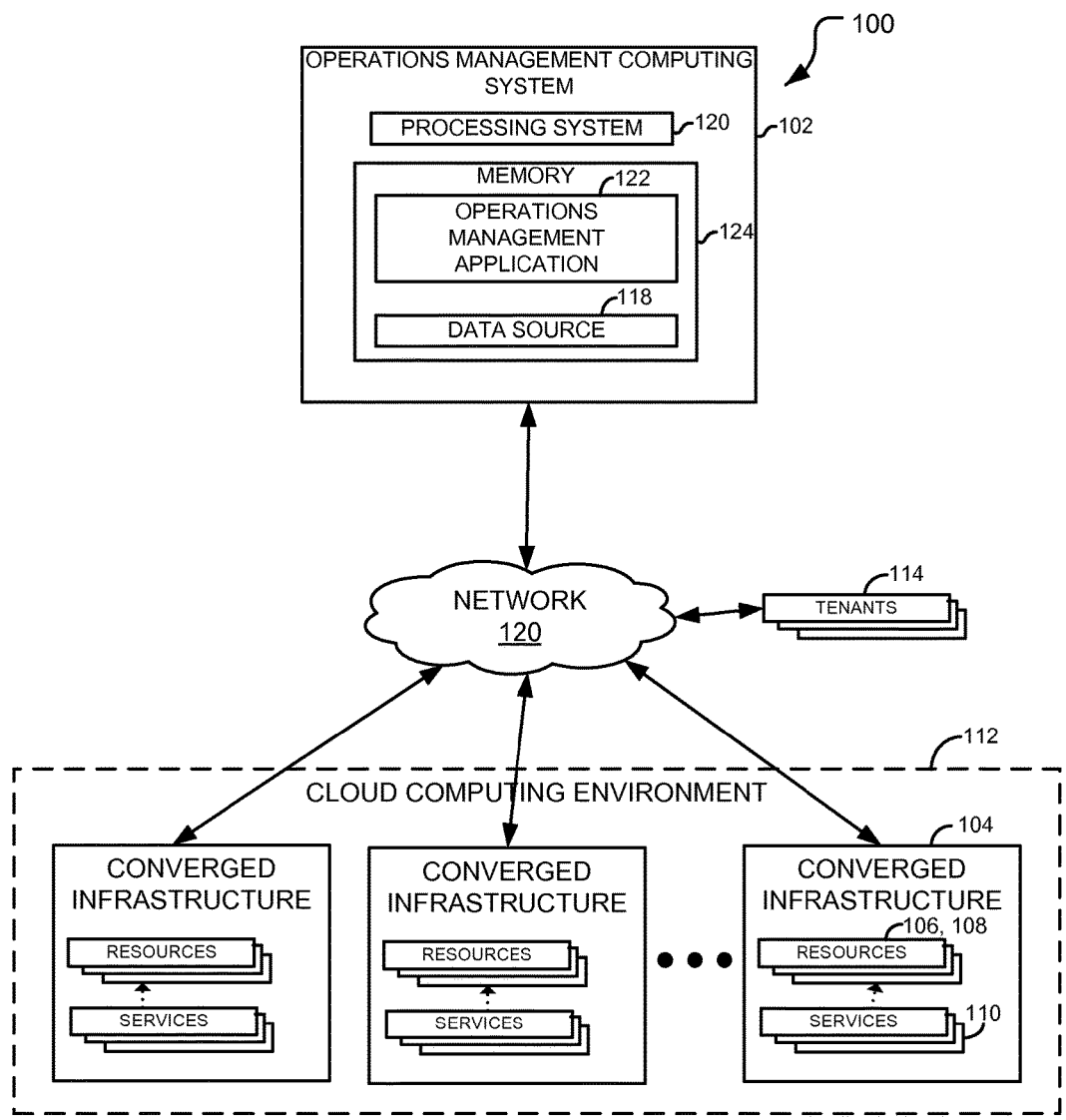
FIGS. 1A through 1D illustrate an example operations management system according to one embodiment of the present disclosure.

Embodiments of the present disclosure provide a system for tagging resources used in a virtual computing environment to include information associated with services provided by each resource. Operations management applications have been implemented to manage and otherwise maintain an ongoing inventory of resources (e.g., hardware resources and virtual objects) used in virtual computing environments. Nevertheless, the services provided by each resource often changes over time during operation of the virtual computing environment. Embodiments of an operations management application described herein assigns a tag for each resource used in the virtual computing environment service to, among other things, provide a means for administrators of the virtual computing environment to easily determine what services are provided by each resource at any given point in time.

Computing systems that function with a virtual computing environment are often referred to as converged infrastructures or integrated infrastructures. Computing systems such as these often include multiple hardware resources (e.g., hosts) that each executes one or more virtual resources (e.g., virtual objects). Converged infrastructures may involve multiple computing components pre-integrated into an optimized computing solution. The computing components of a converged infrastructure solution may include servers, data storage components, networking equipment and software for managing the integrated components. To assist in the scalability, management and sharing of resources, particularly in large computing system environments, converged infrastructures may involve a pool of server, storage and networking capacities, typically virtualized, that can shared by multiple applications. One particular example of a converged infrastructure includes a Vblock™ System infrastructure package available from VCE, LLC, which is headquartered in Richardson, Tex.

Example hardware resources of the converged infrastructure may include any type of hardware that provides physical resources for the virtual computing environment while the virtual objects include logical entities, such as virtual machines, virtual switches, and virtual storage units. Virtual objects may also include logical configuration constructs, such as storage partitions (e.g., tenant partitions), port groups, virtual private clouds, virtual local area networks (LANs), private virtual data centers (PVDCs), that may be individually allocated to one or more users commonly referred to as tenants. These hardware and virtual resources function in a collaborative manner to provide one or more services for the tenants.

Virtual computing environments may also be embodied as a cloud computing environment. Whereas certain computing systems generally include localized, stand-alone structures, a cloud computing environment usually includes networked components which may be in one or more remotely configured computing systems that function in a collaborative manner to provide delegated services for multiple tenants over a diverse geographic region.

Within this disclosure, the term 'service' refers to any algorithm, process, or application that performs a function provided by the virtual computing environment. For example, an application, such as a word processor, may be referred to as a service. As another example, a computer monitoring process that continually monitors one or more parameters of a processor of a hardware resource may also be referred to as a service. Additionally, functions operating in a software-as-a-service (SaaS) environment may also be referred to as a service.

Although operations management systems have been developed for managing resources in a virtual computing environment, they often do not provide adequate visibility for those resources responsible for each service provided by the virtual computing environment. That is, they often do not identify which resources may be executing a service at any given point in time. For example, if a cloud computing environment is partitioned to be used by multiple tenants, it is generally difficult using existing operations management systems to identify those hardware resources and virtual resources that are used to provide those services for each tenant. Additionally, certain resources that are no longer used to provide services for any tenant (e.g., orphaned) are often difficult to identify due to this lack of visibility.

FIGS. 1A through 1D illustrate an example operations management system 100 according to the teachings of the present disclosure. The operations management system 100 addresses these problems with conventional management operations systems among other benefits and solutions. The system 100 includes an operations management computing system 102 that communicates with one or more converged infrastructures 104 to monitor and control their operation. As will be described in detail herein, the system 100 collects information associated with multiple resources of each converged infrastructure 104, identifies the resources 106,108 used for each service 110 provided by each converged infrastructure 104, generates a tag for each resource 106, 108 including the identified information, and stores the collected resource information along with its respective tag so that each resource may be tracked and monitored according to the services of the converged infrastructure that it supports.

The converged infrastructures 104 arranged as shown herein comprise a cloud computing environment 112 in which the services 110 may be provided for one or more tenants 114 of the cloud computing environment 112. Nevertheless, it should be understood that the system 100 may be used to manage a single converged infrastructure 104 or any other computing system operating in and/or providing a virtual computing environment. The tenants 114 generally refer to clients of the system 100 that have access to, and utilize resources 106, 108 on a lease-by-lease basis. In one aspect, the converged infrastructures 104 comprise a combination of converged infrastructures configured in a cloud computing environment. While some examples disclosed herein reference converged infrastructures, also sometimes referred to as unified computing systems, fabric-based computing systems, and dynamic infrastructures, systems and method described herein may be applied to other computing environments.

Although the illustrated cloud computing environment 112 only includes converged infrastructures 104, it should be understood that other cloud computing environments may include other components, such as gateways for secure management of data used by the tenants, communication nodes for communication among the multiple converged infrastructures 104, and/or other devices that support the overall operation of the cloud computing environment 112. In the example system described herein, each tenant 114 includes a processing system that executes instructions stored in a memory for performing the one or more features described herein.

Services 110 provided in the cloud computing environment 112 may be relatively efficient due to their ability to share computing resources across multiple tenants, while delegating software development and maintenance costs to an administrator of the cloud computing environment, such as the administrator of the operations management system 100. Nevertheless, the services 110 provided by the cloud computing environment 112 often require active management to ensure their optimal performance. For example, services 110 provided to a particular tenant 114 may be migrated from one converged infrastructure 104 to another converged infrastructure 104 to provide load balancing for each converged infrastructure 104 in the system. Such migration of services 110 may result in the over use, or under use of certain resources 106, 108 of each converged infrastructure 104. Furthermore, certain resources 106, 108 may become unused (e.g., orphaned) in that, in some instances, no services 110 are provided by these resources 106, 108 following a migration. Embodiments of the present disclosure provide a solution to this problem using tags assigned to each resource 106, 108 where the tags indicate what services 110 are provided by the tagged service so that administrators of the system 100 may easily determine what services are provided by each resource 106, 108 at any given point in time.

Figure 1B:
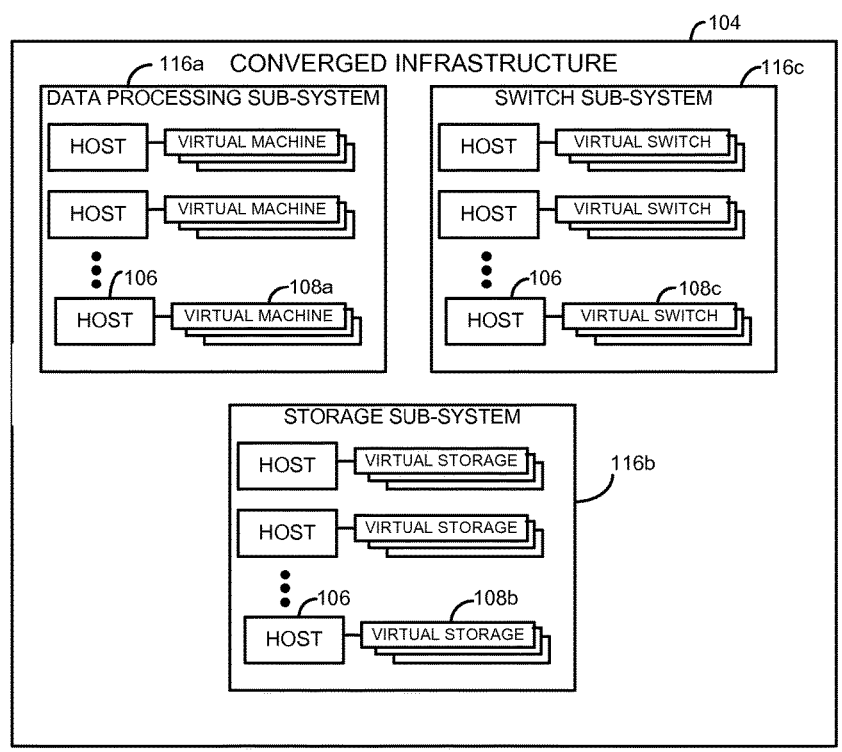
Figure 1C:
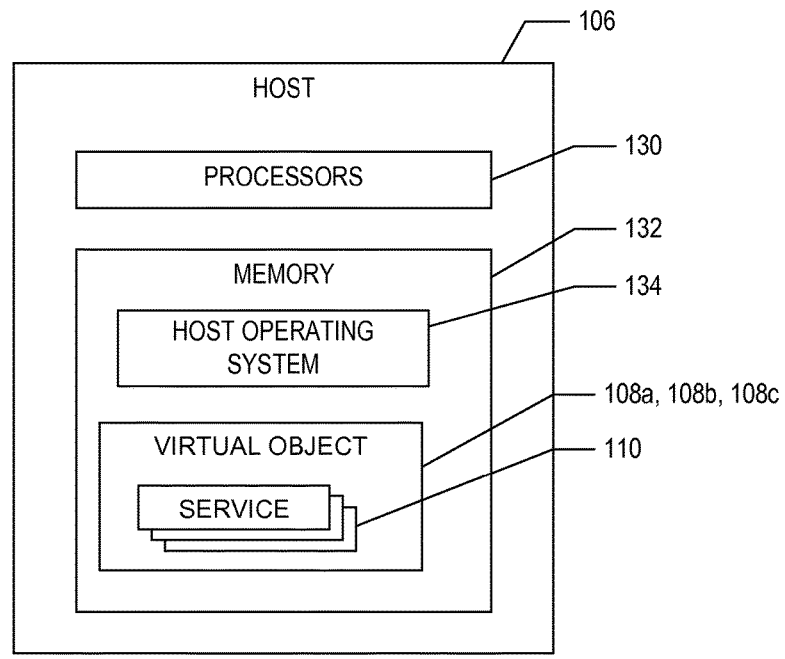
Figure 1D:
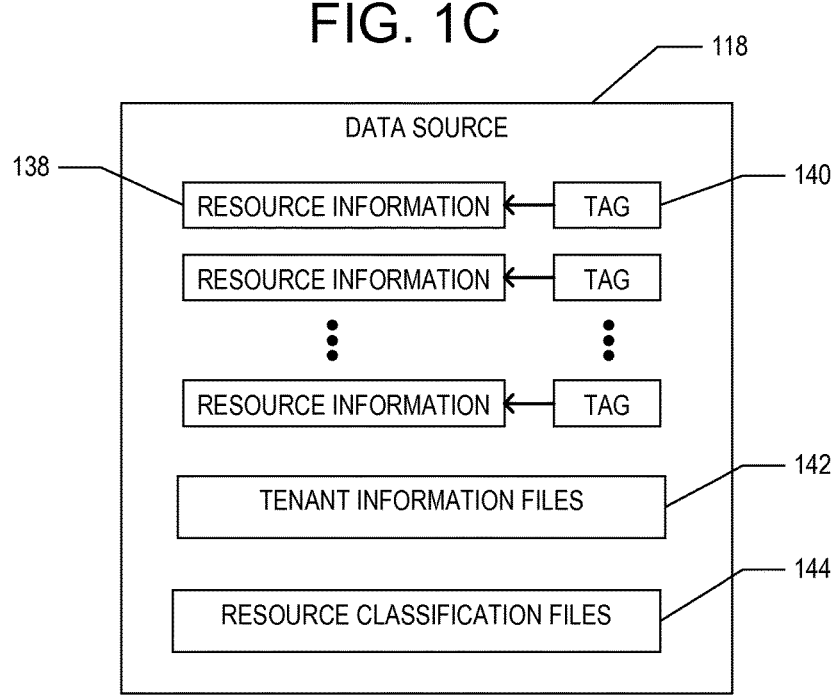

FIG. 1B illustrates an example converged infrastructure 104 according to the teachings of the present disclosure. The converged infrastructure 104 may include multiple hosts 106 that each executes one or more virtual objects (e.g., virtual machines 108a, virtual storage objects 108b, and virtual switch objects 108c). The hosts of a converged infrastructure are often referred to as compute servers. Nevertheless in this disclosure, the term host may be interpreted as any physical device and/or component of the converged infrastructure that support the operation of virtual resources and services provided by those virtual resources. The particular converged infrastructure 104 as shown includes several sub-systems, such as a data processing sub-system 116a, a data storage sub-system 116b, and a switch sub-system 116c. Nevertheless, it should be understood that other converged infrastructures 104 may include additional, fewer, or different types of sub-systems without departing from the spirit and scope of the present disclosure.

In one aspect, each converged infrastructure 104 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments and converged infrastructure, such as a computer cluster, computing grid, blade array, and/or other converged infrastructure may be managed using the teachings of the present disclosure. For example, a converged infrastructure 104 such as that shown includes components found in Vblock™ System infrastructure packages available from VCE, LLC, which is headquartered in Richardson, Tex.

In one aspect, the data storage sub-system 116b includes computer-readable memory structures for storing data used by the converged infrastructure 104, which may include network attached storage (NAS) arrays and/or storage area network (SAN) arrays that are associated with virtual objects (e.g., virtual storage objects 108b). The switch sub-system 116c provides for communication among the various sub-systems of the converged infrastructure 104, and may include components, such as fabric interconnect systems, Ethernet switches/routers, multilayer director switches (MDSs), and the like. The data processing sub-system 116a executes applications that access, store, and otherwise manipulate data stored by the converged infrastructure 104. For a particular example, either of the data storage sub-system 116b, the switch sub-system 116c, and/or the data processing sub-system 116a may comprise a blade computing platform having multiple hosts (e.g., blade computing devices) 106 that each executes one or more virtual objects.

Each sub-system includes multiple hosts 106 that each executes one or more virtual objects, which in this particular example, are virtual machines (VMs) 108a, virtual storage objects 108b, and virtual switch objects 108c. For example, virtual objects, such as the VMs 108a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMWARE ESX™ software suite that is available from VMware Corporation, which is headquartered in Palo Alto, Calif.

The hosts 106 of each sub-system 116 generally refer to the hardware resources of the computing infrastructure, while the virtual objects 108 of each sub-system 116 generally refer to virtual resources of the computing infrastructure. Virtual resources may also include one or more logical configuration constructs that are managed by the application 104. For example, one type of logical configuration construct includes a tenant partition in which certain resources are allocated by each tenant (e.g., user) of the virtual computing environment, the information of which may be stored in the tenant information files 142. For example, one tenant partition may dedicate the use of a certain number of virtual machines 108a, virtual switches 108b, and virtual storage units 108c to be used by one tenant, while another tenant partition may dedicate the use of other virtual machines 108a, virtual switches 108b, and virtual storage units 108c. Additionally, each tenant partition may specify certain levels of performance to be maintained by the virtual computing environment, such as a specified level of data throughput to be transmitted through the cloud computing environment, and/or a specified level of processing load to be provided by the cloud computing environment.

The operations management computing system 102 includes a processing system 120 that executes an operations management application 122 using a data source 118 stored in a computer-readable media (e.g., volatile or non-volatile memory) 124. The management computing system 102 may include any type of computing system, such as one or more management computing systems, personal computers, mobile computers and/or other mobile devices, and other hosts. The management computing system 102 may communicate with the converged infrastructure 104 via wireless and/or wireline communications.

The operations management application 122 maintains information about the resources used in the cloud computing environment and stores this information in the data source 118. The operations management application 122 may also control one or more aspects of the resources executed by the cloud computing environment 112. Any suitable type of operations management application 122 may be implemented with the teachings of the present disclosure. In one embodiment, the operations management system 100 may include a VSPHERE™ software suite that is available from VMware Corporation, which is headquartered in Palo Alto, Calif.

The operations management computing system 102 and the converged infrastructures 104 communicate with one another in any suitable manner, such as using wireless, wired, and/or optical communications. In one embodiment, the operations management computing system 102 and the converged infrastructure 104 communicates with one another using a communication network 120, such as the Internet, an intranet, or another wired and/or wireless communication network. In another embodiment, the management computing system 102 and converged infrastructure 104 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the operations management computing system 102 and converged infrastructure 104 may communicate with one another without the use of a separate and a distinct network. Additionally, other embodiments contemplate that the modules employed by the operations management application 122 are executed by a computing device configured on the converged infrastructure 104.

FIG. 1B depicts an example host 106 implemented on each converged infrastructure 104 according to one aspect of the operations management system 100. The host 106 is a computing or processing device that includes one or more processors 130 and a memory 132. For example, the host 106 can be a personal computer, such as a laptop or notebook computer, a workstation, or other processing device such as a personal digital assistant or a tablet computer. In a particular embodiment, the host 106 is a rack mounted host, such as blade host in which multiple blade hosts share a common backplane for communication with one another and for receiving power from a rack mounted power distribution unit. The memory 132 stores a host operating system 132 and one or more virtual objects (e.g., VMs 108a, virtual storage objects 108b, and virtual switch objects 108c) that are executed by the processor 130. The host operating system 132 controls and manages the operation of the virtual objects executed on the host 106. For example, control signaling for starting, stopping, and/or changing operating parameters of each virtual object is managed through the host operating system 132. Each virtual object 108 may execute one or more services 110 whose operation is controlled by the virtual object 108 executing the services 110.

A data source 118 stores resource information files 138 that include information associated with resources used by each of the converged infrastructures 104. The data source 118 also stores tags 140 providing information about which services 110 are used by each resource as well as other resources associated with that resource. For example, the tag 140 associated with a virtual object 108a, 108b, or 108c may include information about which services 110 are executed on that virtual objects 108a, 108b, or 108c as well as a host on which that virtual object 108a, 108b, or 108c is executed on. The data source 118 also stores tenant information files 142 and resource classification files 144. The tenant information files 142 are used by the system 100 for maintaining information about each tenant 114 that uses the system 100. For example, the tenant information files 142 may include information about pre-arranged lease agreements between the tenant and the administrator of the system, such as guaranteed processing load requirements, and a level of expected availability of the system.

Each tag 140 may store information about its respective resource 106, 108 in any suitable manner. In one embodiment, each tag 140 stores the information in an alpha-numeric, comma-delimited string. For example, a particular tag 140 for a virtual object may include an identifier for the virtual object, an identifier for a host on which the virtual object 108a, 108b, or 108c is executed, and one or more services 110 executed on the virtual object, which are all delimited by commas. Nevertheless, it should be understood that the tag 140 may be stored in other formats, such as in an XML-based format. Although the data source 118 is shown as being located on, at, or within the management computing system 102, it is contemplated that the data source 118 can be located remotely from the management computing system 102, such as on, at, or within a memory 132 of one of the hosts 106, or an external database managed by the converged infrastructure 104.

Figure 2:
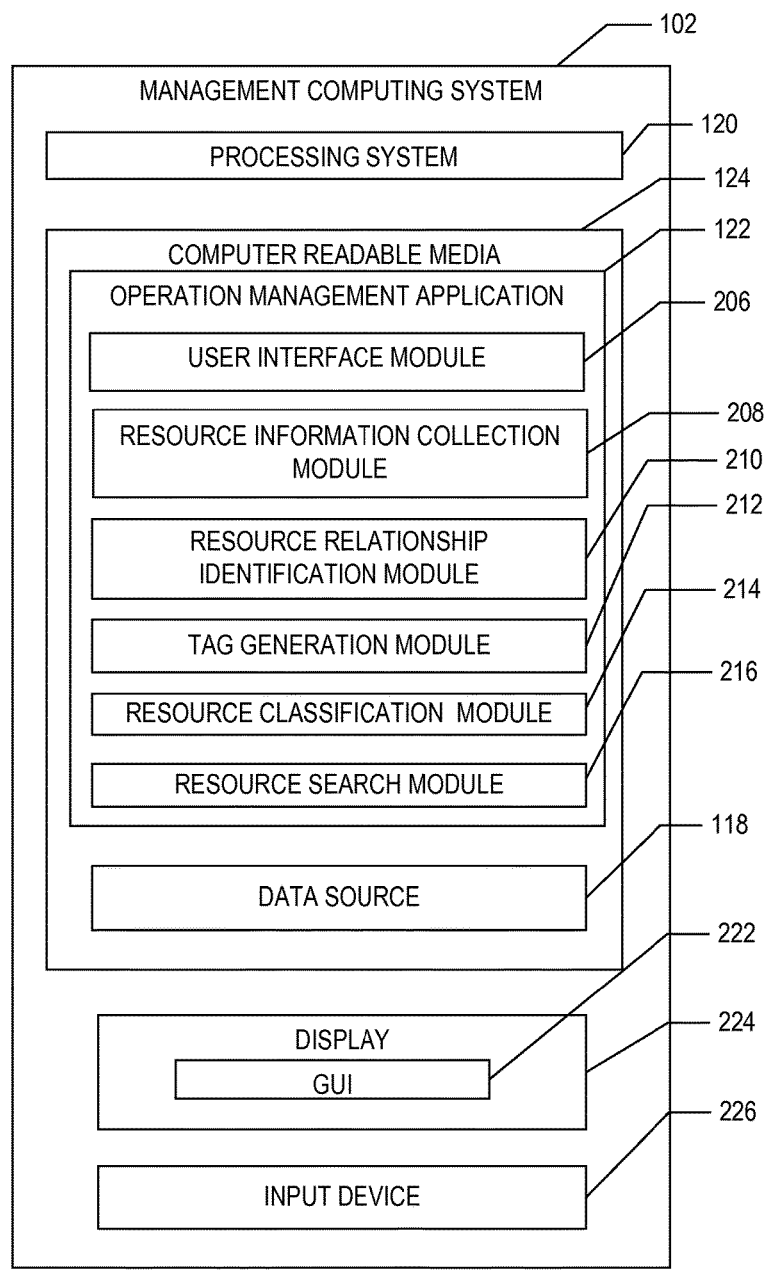
FIG. 2 is a block diagram depicting an example operations management application executed on the operations management computing system according to one embodiment of the present disclosure.

Referring now in more detail to FIG. 2, a block diagram of an example operations management application 122 executed on the management computing system 102, is depicted according to one aspect of the present disclosure. The operations management application 122 collects resource information for each resource of a cloud computing environment 112, identifies the services 110 provided by each resource 106, 108 and other resources 106, 108 associated with that resource 106, 108, generates a tag 140 indicative of the identified information, and stores the identified information in the data source 118.

The operations management application 122 is stored in a memory 130 (i.e., computer readable media) and is executed on a processing system 120 of the management computing system 102. According to one aspect, the operations management computing system 102 also includes a graphical user interface (GUI) 222 displayed on the display 224, such as a computer monitor, for displaying data. The operations management computing system 102 also includes an input device 226, such as a keyboard or a pointing device (e.g., a mouse, trackball, pen, or touch screen) to enter data into or interact with the GUI 222. According to one aspect, the operations management application 122 includes instructions or modules that are executable by the processing system 202 as will be described in detail herein below.

The computer readable medium 130 includes volatile media, nonvolatile media, removable media, non-removable media, and/or another available medium. By way of example and not limitation, non-transitory computer readable medium 130 comprises computer storage media, such as non-transient storage memory, volatile media, nonvolatile media, removable media, and/or non-removable media implemented in a method or technology for storage of information, such as computer readable instructions, data structures, program modules, or other data.

A user interface module 206 facilitates the receipt of input data and/or output data from or to a user, respectively. In one example, the user interface module 206 displays a representation of each virtual object 108, a representation of each host 106, and an indicator representing an association between each virtual object and the host 106 that executes the virtual object. In another example, the user interface 206 may also receive user input for manipulating or otherwise modifying the operation of the virtual object representations or host representation displayed on the display 110. The user interface module 206 also displays one or more selectable fields, editing screens, and the like for receiving the management information from the user.

A resource information collection module 208 collects information about the resources 106, 108 from each of the converged infrastructures 104 in the system 100. For example, the resource information collection module 208 provides an interface for communicating with each converged infrastructure 104 in which the converged infrastructure 104 exposes one or more APIs for each of its hosts 106 that may be accessed by the resource information collection module 208. The resource information collection module 208 may also receive status information from each converged infrastructure 104 for monitoring various operational aspects of the converged infrastructure 104, such as configuration, operational status, system alarm conditions, and the like.

A resource relationship identification module 210 identifies, for each collected resource, other resources related to that resource as well as any services executed on the resource. For example, the resource relationship identification module 210 identifies those services executed on the subject resource, and also identifies other resources associated with the subject resource 106, 108. The resource relationship identification module 210 may obtain this information in any suitable manner. In one embodiment, the resource relationship identification module 210 identifies related resources and services by querying the hosts 106 and/or virtual objects 108 of the converged infrastructure 104. In another embodiment, the resource relationship identification module 210 identifies related resources and services by querying other management applications, such as element managers (e.g., VMWARE ESX™ and/or VCENTER™) executed on the computing system 102 or another computing system external to the operations management computing system 100.

A tag generation module 212 generates a tag 140 for each resource 106, 108 identified by the application 122. For example, the tag generation module 212 receives resource and service information identified by the resource relationship identification module 210 and constructs a coded string, such as an alpha-numeric, comma delimited string that includes the identified information. As another example, the tag generation module 212 receives resource and service information identified by the resource relationship identification module 210 and constructs an XML-formatted object that includes the identified information.

A resource classification module 214 classifies the collected resources 106, 108 according to one or more criteria. For example, the resource classification module 214, using the tags 140 generated for each resource, classifies the resources according to which services (e.g., executable applications) are executed on the resources 106, 108. That is, the resource classification module 214 may aggregate into one record, all those resources 106, 108 responsible for execution of a word processing application, while aggregating into another record, all those resources responsible for execution of a web browser application and store this information in the resource classification files 144. As another example, the resource classification module 214 classifies the resources 106, 108 according to the tenants 114 that use the resources 106, 108. In this case, the resource classification module 214 may access the tenant information files 142 to determine which services 110 are allocated for use by that tenant and classify the resources 106, 108 according to those services 110 used by that tenant 114. As yet another example, the resource classification module 214 classifies each resource 106, 108 according to a level of usage of each resource 106, 108 in the cloud computing environment 112. In this case, the resource classification module 214 may classify those resources 106, 108 executing a relatively large number of services separately from other resources that execute relatively fewer services. Additionally, the resource classification module 214 may classify those resources 106, 108 that execute relatively few or no services, such as those resources 106, 108 that may been orphaned due to migration of services away from that resource 106, 108. As yet another example, the resource classification module 214 classifies each resource 106, 108 according to other resources 106, 108 related to that resource 106, 108. For example, the resource classification module 214 may classify each virtual object 108 with the host 106 that executes the virtual object 108, and other virtual objects, such as port groups, tenant partitions or other logical configuration constructs that may be associated with the virtual object 108.

A resource search module 216 searches for resources 106, 108 in the system 100 according to one or more user-defined criteria. That is, the resource search module 216 may receive a request for information about certain resources 106, 108 used by the cloud computing system 112, and in response, search for those resources 106, 108 using the criteria included in the request. For example, the resource search module 216 may receive a request including a search string or keyword to be compared with the tags 140 stored in the data source 118. The resource search module 216 will identify all tags having that search string and transmit the information associated with those resources having tags meeting that criteria. As another example, the resource search module 216 may receive a request including information with a particular tag, in response, search through the data source 118 and return information with any resources that matches that particular tag issued in the request.

It should be appreciated that the modules described herein are provided only as examples, and that the application 122 may have different modules, additional modules, or fewer modules than those described herein. For example, one or more modules as described in FIG. 2 may be combined into a single module. As another example, certain modules described herein may be encoded on, and executed on other computing systems, such as on one of the hosts 106 of a converged infrastructure 104 of the cloud computing environment 112.

Figure 3:
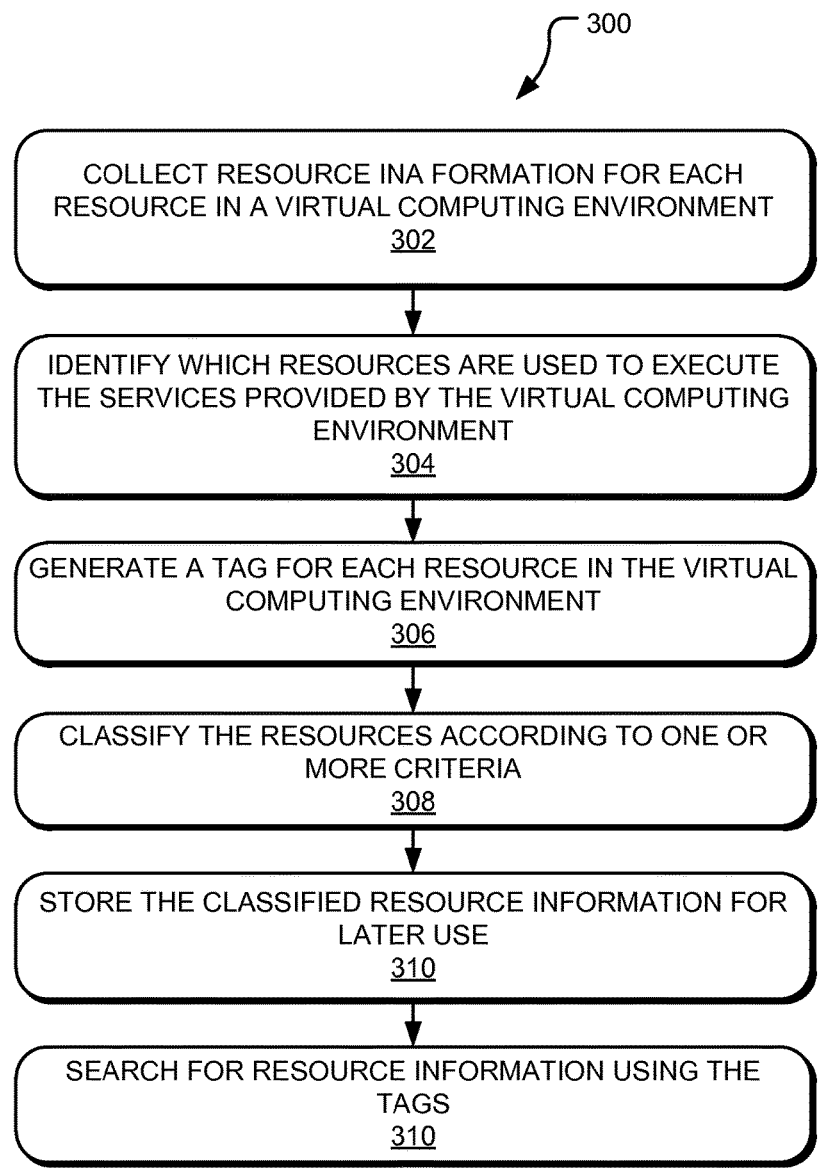
FIG. 3 illustrates an example process that is performed by the operations management application according to one embodiment of the present disclosure.

FIG. 3 illustrates an example process 300 that is performed by the operations management application 122 to classify resources used by one or more converged infrastructures 104 in a virtual computing environment.

In step 302, the application 122 collects resource information from each of the resources 106, 108 used in the system 100. The resources 106, 108 may be collected from any suitable source. In one aspect, the application 122 may directly query one or more resources (e.g., virtual machines, network switches, storage area network (SAN) switches, etc.) to collect the resource information. For example, the application 122 may collect SAN information by directly querying hosts 106 in the storage sub-system to determine any logical unit number (LUN) mapping, masking, zones, and/or virtual storage area networks (VSANs) configured in the storage sub-system.

In another aspect, the application 122 may also query other executable applications or components of the system 100 to collect the resource information. For example, the application 122 may query one or more other operations management applications, such as an element manager, such as CISCO UCS MANAGER™, a cloud computing environment manager, such as VMWARE VCLOUD DIRECTOR™, and/or a converged infrastructure manager, such as VCENTER™. For example, the application 122 may collect cloud setup information from an operations management application, such as the VSPHERE™ cloud management application to determine any physical partitioning information.

In one embodiment, the application 122 employs a network analysis tool, such as a network sniffer, to intercept and analyze network packets conveyed across the various resources to collect the resource information. For example, the application 122 analyzes network packets transmitted from each virtual object to determine its source IP address, a MAC address, and/or along with sub-network information (e.g., network mask) used by that virtual object.

The application 122 may then use this information to determine which virtual objects are associated with which hosts, and which process resources are associated with which virtual objects. For example, the application 122, using the source IP address, destination IP address, and/or sub-network, may determine which network the virtual object is part of and other resources that the virtual objects communicates with. Additionally, the application 122 uses the collected MAC address information to determine which host executes that virtual object. For example, the application 122 may determine, according to analysis of an IP packet, that a virtual machine of the data processing sub-system is coupled to a port group of a VLAN of the switch sub-system by analyzing the source IP address and/or destination address of the IP packet. Additionally, the application 122 may determine any port groups that may exist using sub-network (e.g., network mask) information included in the IP packet.

Once port information is obtained for the virtual object, the application 122 then queries a process monitoring application executed on the virtual object to collect process information for determining the process resources 106, 108 executed on the virtual object and any port numbers used for communication with other processes via the ports of the virtual object. The application 122 then combines the collected information to determine which process resources 106, 108 are associated with the virtual object.

Once the resource information is collected, the application 122 then stores the collected resource information in the data source 118.

In step 304, the application 122 identifies which resources are used to execute the services provided by the system 100. In one embodiment, the application 122 identifies the services executed by each resource by querying one or more other operations management applications as described above. In another embodiment, the application 122 identifies the services executed by the resources 106, 108 by querying the resources 106, 108 directly, such as by querying a process monitoring application executed on each virtual object, or by querying a process monitoring application executed on each host. For example, the application 122 may query the process monitoring application executed on a virtual object to determine which services 110 are provided by that virtual object.

In step 306, the application 122 generates a tag 140 for each resource 106, 108 in the system 100. The tag 140 includes information about other resources 106, 108 associated with that resource 106, 108, and also includes information about services 110 provided by that resource 106, 108. For example, a tag 140 for a virtual object resource may include information about the host on which the virtual object is executed in addition to any logical configuration constructs (e.g., tenant partitions, port groups, etc.) that are executed on that virtual object. Once generated, the application 122 then stores the tag along with its respective resource information in the data source 118.

In step 308, the application 122 classifies the resource information and the service information according to one or more criteria. In one aspect, the application 122 may classify each resource 106, 108 according to its usage level relative to the other resources in the cloud computing environment 112. In this particular case, the application 122 may classify a certain group of resources 106, 108 as operating at near or full capacity, another group of resources 106, 108 as operating within certain capacity level range, and yet another group of resources 106, 108 as operating at a minimum capacity (e.g., an orphaned resource).

In another aspect, the application 122 classifies each resource 106, 108 according to the tenants 114 that use the cloud computing environment 112. For example, the application 122 may collect tenant information from physical partitioning information allocated for each tenant. The application 122 may determine resource usage for each tenant 114 by collecting information about which clusters are allocated for use by each tenant, and determining resources used for each tenant 114 by associating hosts used to serve each cluster. Also, the application 122 may collect boot information for certain hosts to determine what portion of the storage system is assigned to those tenants.

In yet another aspect, the application 122 classifies each resource 106, 108 according to other resources 106, 108 that function with that resource 106, 108 to provide the services 110 used by the tenants 114. For example, a network resource, such as a virtual switch 108b, may be related to one or more other logical configuration constructs, such as a storage partition (e.g., tenant partition), a port group, a virtual private cloud, a virtual local area network (VLAN), and/or a private virtual center (PVC) as well as one or more virtual machines, and a host 106. As another example, a datastore, such as a virtual storage object 108c, may be related to a host 106, a virtual machine 108a, a virtual private cloud (VPC), a storage partition, a tenant 114, and one or more tenants 114.

In step 310, the application 122 stores the classified resource information in the data source 118 for later use. In one aspect, the application 122 stores the classified resource information in the resource classification files 144 of the data source 118. In another aspect, the application 122 modifies the tags 140 associated with each resource to include the classified information.

In step 312, the application 122 facilitates searches for resource information. That is, the application 122 receives requests from a user, such as through a user interface 222 of the management computing system 102, searches for certain resources that meet any criteria specified in the requests, and transmits resource information meeting that criteria back to the user interface 222 for view by the users. Requests for searches may include any suitable type of criteria, such as those criteria described above with respect to step 308. In one embodiment, step 308 may be performed again to re-classify the resource information into a form desired by the user. In another aspect, the resource classification files 144 stored in the data source 118 may be a relational database in which the tags 140 for each resource 106, 108 are stored such that re-classification may not be needed.

The previous steps may be repeatedly performed for continual collection, identification, classification, and storage of information associated with resources used by the system 100. For example, steps 302 through 310 may be performed on periodic basis (e.g., once a day) so that up to date information for the virtual computing environment may be ensured. Nevertheless, when use of the application 122 is no longer needed or desired, the process ends.

Although FIG. 3 describes one example of a process that may be performed by the application 122 for collecting, classifying, storing, and searching for resources 106, 108 in a virtual computing environment, the features of the disclosed process may be embodied in other specific forms without deviating from the spirit and scope of the present disclosure. For example, the application 122 may perform additional, fewer, or different operations than those operations as described in the present example. As another example, the steps of the process described herein may be performed by a system other than the application 122, which may be, for example, one of the virtual objects executed on the converged infrastructure 104.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 4:
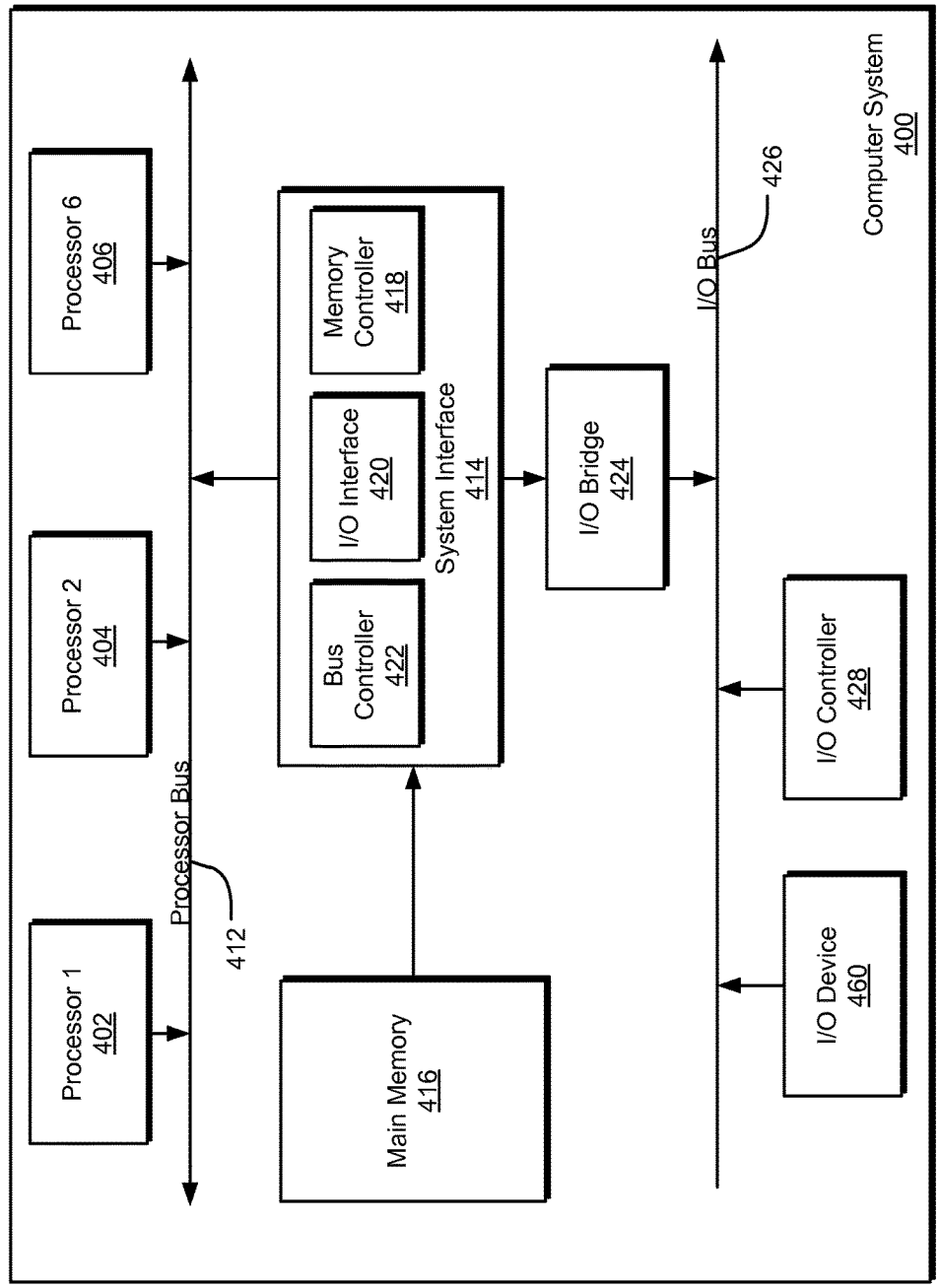
FIG. 4 is a block diagram illustrating an example of a computing device or computer system which may be used in implementing the embodiments of the present disclosure.

For example, FIG. 4 is a block diagram illustrating an example of a host or computer system 400 which may be used in implementing the embodiments of the present disclosure. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 413 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
   collecting, using instructions stored on a non-transitory computer-readable medium and executed on at least one processor, resource information associated with a plurality of virtual object resources of a virtual computing environment from at least one physical resource of the virtual computing environment, the virtual object resources executed on a plurality of hardware resources of the virtual computing environment;
   identifying, using the instructions executed on the at least one processor, one or more of the virtual object resources that execute one or more executable applications provided by the virtual computing environment;
   generating, using the instructions executed on the at least one processor, a tag for each virtual object resource, the tag including an identifier of the one or more executable applications executed by the virtual object resource, the virtual object resource comprising at least one logical configuration construct of a storage partition, a tenant partition, a port group, a virtual private cloud, a virtual local area network, or a private virtual data center; and
   classifying, using the instructions executed on the at least one processor, one or more of the virtual object resources that executes one of the executable applications using the identifier of the one or more executable applications included in each of the tags.

2. The method of claim 1, further comprising classifying the virtual object resources according to at least one of a usage level of each virtual object resource, and one or more tenants that use the virtual computing environment.

3. The method of claim 1, further comprising collecting the resource information by querying one or more other executable applications associated with the virtual computing environment.

4. The method of claim 1, further comprising collecting the resource information by analyzing a plurality of Internet protocol (IP) packets transmitted by each virtual object resource and deciphering the resource information according to at least one of a destination address, a source address, and a port address included in the IP packets.

5. The method of claim 1, further comprising collecting the resource information from the virtual object resources by querying a process monitoring application executed on the virtual object resource.

6. A system comprising:
a computing system comprising at least one processor and at least one memory to store instructions that are executed by the at least one processor to:
- collect resource information associated with a plurality of virtual object resources of a virtual computing environment from at least one physical resource of the virtual computing environment, the virtual object resources executed on a plurality of hardware resources of the virtual computing environment;
- identify one or more of the virtual object resources that execute one or more executable applications provided by the virtual computing environment;
- generate, a tag for each virtual object resource, the tag including an identifier of the one or more executable applications executed by the virtual object resource, the virtual object resource comprising at least one logical configuration construct of a storage partition, a tenant partition, a port group, a virtual private cloud, a virtual local area network, or a private virtual data center; and
- classify one or more of the virtual object resources that executes one of the executable applications using the identifier of the one or more executable applications included in each of the tags.

7. The system of claim 6, wherein the instructions are further executed to classify the virtual object resources according to at least one of a usage level of each virtual object resource, and one or more tenants that use the virtual computing environment.

8. The system of claim 6, wherein the virtual computing environment comprises a cloud computing environment implemented in a converged infrastructure.

9. The system of claim 6, wherein the tag comprises a comma delimited, alpha-numeric string.

10. The system of claim 6, wherein the instructions are further executed to collect the resource information by querying one or more other executable applications associated with the virtual computing environment.

11. The system of claim 6, wherein the instructions are further executed to collect the resource information by analyzing a plurality of Internet protocol (IP) packets transmitted by each virtual object resource and deciphering the resource information according to at least one of a destination address, a source address, or a port address included in the IP packets.

12. The system of claim 6, wherein the instructions are further executed to collect the resource information from one virtual object resource by querying a process monitoring application executed on the virtual object resource.

13. A non-transitory, computer readable medium storing information and instructions that when executed by at least one processor, is operable to perform at least the following:
- collecting resource information associated with a plurality of virtual object resources of a virtual computing environment from at least one physical resource of the virtual computing environment, the virtual object resources executed on a plurality of hardware resources of the virtual computing environment;
- identifying one or more of the virtual object resources that execute one or more executable applications provided by the virtual computing environment;
- generating, a tag for each virtual object resource, the tag including an identifier of the one or more executable applications executed by the virtual object resource, the virtual object resource comprising at least one logical configuration construct of a storage partition, a tenant partition, a port group, a virtual private cloud, a virtual local area network, or a private virtual data center; and
- classifying one or more of the virtual object resources that executes one of the executable applications using the identifier of the one or more executable applications included in each of the tags.

14. The non-transitory, computer readable medium of claim 13, wherein the instructions, when executed, are further operable to perform classifying the virtual object resources according to at least one of a usage level of each virtual object resource, and one or more tenants that use the virtual computing environment.

15. The non-transitory, computer readable medium of claim 13, wherein the instructions, when executed, are further operable to perform collecting the resource information by querying one or more other executable applications associated with the virtual computing environment.

16. The non-transitory, computer readable medium of claim 13, wherein the instructions, when executed, are further operable to perform collecting the resource information by analyzing a plurality of Internet protocol (IP) packets transmitted by each virtual object resource and deciphering related resource information according to at least one of a destination address, a source address, and a port address included in the IP packets.

* * * * *